United States Patent [19]

Kawamura et al.

[11] Patent Number: 5,520,148
[45] Date of Patent: May 28, 1996

[54] HEAT INSULATING STRUCTURE FOR SWIRL CHAMBERS

[75] Inventors: Hideo Kawamura, Samukawa; Takatoshi Sugano, Sagamihara, both of Japan

[73] Assignee: Isuzu Motors Limited, Tokyo, Japan

[21] Appl. No.: 403,103

[22] Filed: Mar. 13, 1995

[51] Int. Cl.⁶ .................................................. F02F 1/00
[52] U.S. Cl. .................................................. 125/254
[58] Field of Search .............................. 123/254, 292, 123/271

[56] References Cited

U.S. PATENT DOCUMENTS

| | | | |
|---|---|---|---|
| 5,010,861 | 4/1991 | Matsuoka | 123/271 |
| 5,014,664 | 5/1991 | Matsuoka | 123/271 |
| 5,040,504 | 8/1991 | Matsuoka | 123/254 |
| 5,065,714 | 11/1991 | Matsuoka | 123/254 |
| 5,178,109 | 1/1993 | Kawamura | 123/292 |

FOREIGN PATENT DOCUMENTS

| | | |
|---|---|---|
| 0410612 | 7/1990 | European Pat. Off. . |
| 3529905 | 8/1985 | Germany . |
| 3611799 | 4/1986 | Germany . |
| 54-45816 | 3/1979 | Japan ................ 123/254 |

Primary Examiner—Raymond A. Nelli
Attorney, Agent, or Firm—Browdy and Neimark

[57] ABSTRACT

This heat insulating structure for swirl chambers enables the heat insulating capability of hot plugs, which form swirl chambers, to be improved by setting an area of contact surfaces of the hot plugs and walls surrounding the same to a proper level. A cylinder head is fixed on a cylinder block with a gasket interposed therebetween, and hot plugs constituting swirl chambers are provided in cavities in the cylinder head, whereby heat insulating air layers are formed between the hot plugs and the cavities. The hot plugs are formed out of a heat resisting ceramic material, and the sum of an area of contact portions of the outer surfaces of the hot plugs and the corresponding portions of the cavities and that of contact portions of the outer surfaces of the hot plugs and the corresponding portions of an upper surface of said cylinder block is set to not more than ⅕ of a total area of the outer surfaces of the hot plugs.

14 Claims, 3 Drawing Sheets

HEAT INSULATING STRUCTURE FOR SWIRL CHAMBERS

BACKGROUND OF THE INVENTION

1. Field of the Invention

This invention relates to a heat insulating structure for swirl chambers, having hot plugs provided in cavities formed in a cylinder head.

2. Description of the Prior Art

A swirl chamber type engine shown in FIG. 5 has heretofore been known. In the swirl chamber type engine, swirl chambers 52 are formed by two-divided members, i.e. upper members 55 and lower members 54 provided in cavities 58 formed in a cylinder head 53 fixed to a cylinder block 56, as shown in FIG. 5. The upper and lower members 55, 54 are provided with air layers 60 formed between the same members 55, 54 and the cavities 58. The upper members 55 are provided with fuel injection nozzles 57 and glow plugs 59, and the lower members 54 constitute hot plugs having communication ports 61 which communicate the swirl chambers 52 and primary chambers 51, which are formed in cylinders, with each other. In order to fix the upper and lower members 55, 54 in the cavities 58 in the cylinder head 53, metal rings 62 are used. The metal rings 62 are fitted in stepped portions 63 of the cavities in the cylinder head 53 so as to reinforce the lower members 54 by applying compression stress thereto, and also position the same.

A swirl chamber type engine shown in FIG. 6 is also known. In this swirl chamber type engine, swirl chambers 72 are formed by two-divided members, i.e. upper members 75 and lower members 74 provided in cavities 78 formed in a cylinder head 73 fixed to a cylinder block 76, as shown in FIG. 6. The upper and lower members 75, 74 are provided in the cavities 78 with air layers 80 formed between the same members 75, 74 and the cavities 78. The upper members 75 are provided with fuel injection nozzles 77 and glow plugs 79, and the lower members 74 constitute hot plugs having communication ports 81 which communicate the swirl chambers 72 and primary chambers 71, which are formed in cylinders, with each other. Metal rings 70 are fitted around outer circumferential portions of the upper and lower members 75, 74. The metal rings 70 are provided with flange portions 69 formed at lower parts thereof and integrally therewith, and the setting flange portions 69 are press fitted in stepped portions 82 of the cavities in the cylinder head 73 so as to fix the metal rings 70 in the stepped portions 82 of the cavities in the cylinder head 73.

Japanese Utility Model Laid-Open No. 45816/1979 discloses a vortex chamber structure for diesel engines. In this vortex chamber structure for diesel engines, a dome which forms a vortex chamber is fitted in a lower surface of a cylinder head, and a mouthpiece having an ejection port is fixed to this lower surface with an insulating air layer formed between the cylinder head and an outer surface of the dome.

As described above, conventional swirl chambers for diesel engines employ a structure in which mouthpieces are provided between primary combustion chambers and swirl chambers, which mouthpieces are heat insulated. Such swirl chambers as a whole are formed out of a ceramic material, such as silicon nitride into a heat insulating structure, whereby the performance and low-temperature startability of the engine are improved. It has been ascertained that, in order to form swirl chambers into a heat insulating structure, providing air layers around the outer circumferential surfaces of the hot plugs constituting the swirl chambers is effective.

SUMMARY OF THE INVENTION

A primary object of the present invention is to solve these problems, and provide a heat insulating structure for swirl chambers, in which hot plugs constituting swirl chambers are formed out of a heat resisting ceramic material and provided in cavities made in a cylinder head, a contact area of the outer circumferential surfaces of the hot plugs and the outer surfaces of the cylinder head and cylinder block being set proper, whereby the degree of heat insulation of the swirl chambers and the low-temperature startability and performance of the engine are improved.

Another object of the present invention is to provide a heat insulating structure for swirl chambers, having a cylinder head fixed on a cylinder block via a gasket, hot plugs provided in the cavities in the cylinder head and constituting swirl chambers, injection nozzles adapted to inject a fuel in an atomized state into the swirl chambers, and air layers formed between the hot plugs and inner surfaces of the cavities in the cylinder head, wherein the hot plugs are formed out of a heat resisting material, a contact are of outer circumferential surfaces of the hot plugs, and the cavity-defining wall surface of the cylinder head and portions which are opposed to an upper surface of the cylinder block and which transmit heat directly or indirectly, being set to not more than 1/5, i.e., 20% of a total outer surface area of the hot plugs.

In this heat insulating structure for swirl chambers, parts of the upper surfaces of the hot plugs are supported on the cylinder head, and parts of lower surfaces thereof on the cylinder block via a gasket, lower portions of the hot plugs being fixed to the cylinder head via fixing rings, lower outer circumferential portions of the hot plugs being fixed to the cylinder head via fixing rings, whereby the air layers are sealed so as to prevent the entry of a gas thereinto.

Accordingly, the contact area of the outer circumferential surfaces of the hot plugs, and the cavity-defining wall surface of the cylinder head and portions which are opposed to an upper surface of the cylinder block include at least contact portions of the lower surfaces of the hot plugs and an upper surface of the cylinder block, and gasket, contact portions of the hot plugs and fixing rings and contact portions of the upper surfaces of the hot plugs and cavity-defining wall surfaces of the cylinder head.

The air layers formed between the outer surfaces of the hot plugs and cavity-defining wall surfaces are sealed with seal gaskets provided between the outer circumferential surfaces of the hot plugs and cavity-defining wall surfaces, and heat resisting gaskets provided between upper and lower divisional members of the hot plugs. Therefore, the temperature and pressure of the air layers become lower than those of the interior of combustion chambers (swirl chambers and primary chambers), so that the heat transfer coefficient of the air layer can be reduced.

The radiation of heat from the heat insulating structure for swirl chambers is as follows. Let Q equal a heat radiation rate of the hot plugs. The Q is then expressed by:

$$Q = K \cdot B \cdot (Tg - Ta)$$

wherein K represents an overall heat transfer coefficient; B a heat radiation surface area; Tg a temperature of a gas in the swirl chambers; and Ta a temperature of cooling water circulated in a water jacket formed in the cylinder head.

Regarding the heat conductivity of an object, a heat flow from a high-temperature region to a low-temperature region is steadily dominated by an overall heat transfer coefficient (unit: kcal/m²·h·°C.).

The overall heat transfer coefficient K is expressed by the following equation.

$$\frac{1}{K} = \frac{1}{\alpha_a} + \frac{1}{\alpha_g} + \frac{\delta_1}{\lambda_1} + \frac{\delta_2}{\lambda_2} + \frac{\delta_3}{\lambda_3}$$

wherein $\lambda_1$ represents a heat transfer coefficient of a ceramic material constitutes the hot plugs; $\lambda_2$ a complexed heat conductivity of the air layers and gaskets; $\lambda_3$ a heat conductivity of a metal, such as cast iron constituting the cylinder head; $\alpha_a$ a heat transfer coefficient of the cooling water circulated in the water jacket formed in the cylinder head; and $\alpha_g$ a heat transfer coefficient of a combustion gas in the swirl chambers to the wall surfaces thereof. As shown in FIG. 4, $\delta_1$ represents the thickness of the hot plugs, $\delta_2$ a size of a clearances in which air layers exist, and $\delta_3$ a distance between the cavity-defining wall surfaces and water jacket.

When typical values are substituted into the elements of the above equation, it is understood that a contribution ratio of the heat transfer coefficient $\alpha_g$ of the combustion gas is high, and that $1/\alpha_g$ is about ten times as large as $\delta_1/\lambda_1$ and $\delta_3/\lambda_3$. A value of $\delta_2/\lambda_2$ will be discussed. A value of $\lambda_2$ can be assumed as follows. The $\lambda_2$ is a complex value of the heat conductivities of the air and gaskets, and $\lambda_1$, $\lambda_3$ and $\alpha_a$ have low contribution ratios, which are 2–3 hundredths (i.e. 2-3/100) of $1/\alpha_g$.

An overall heat transfer coefficient K have a complex value of a heat conductivity and heat transfer coefficient of the air, and is mostly influenced by, especially, a contact surface area of the hot plugs and the cylinder block i.e. a contact surface area of the hot plugs and cylinder block and the materials therefor.

The heat conductivity of the air is 0.00005 cal/sec·cm²·°C., while the heat conductivity of silicon nitride is 0.004 cal/sec·cm²·°C., a ratio of the heat conductivity of the air to that of silicon nitride being 0.00005/0.004=1/80. Therefore, it may be said that attention should be paid mainly to the gaskets.

A value of $\lambda_2$ can be expressed by a function of area, i.e., by the following equation.

$$\lambda_2 = \lambda_a + \frac{A_2 x}{A_1 x} \times (\lambda_g - \lambda_a)$$

wherein $A_1 x$ represents an outer circumferential surface area of the hot plugs, $A_2 x$ an overall heat transfer surface area of the gaskets contacting the outer circumferential surfaces of the hot plugs; and $\lambda_a$ a heat conductivity of the outer circumferential air.

When $A_2 x$ becomes infinitely small, a value of $\lambda_2$ can be assumed to be $\lambda_a$ since a value of $\lambda_a$ is small. When $A_2 x$ is reduced to not higher than a certain level, it becomes a dominant factor of a heat flow, so that the reduction of the overall heat transfer surface area causes the heat insulating capacity of the hot plug to increase.

The overall heat transfer surface area represents a surface area of the portions of the hot plugs which directly contact the gasket on the upper surface of the cylinder block or the upper surface of the cylinder block.

If a value of $1/\alpha_g$ is set to 100%, and, if the value of the overall heat transfer surface area $A_2 x$ can be reduced to ⅕ of that of the outer circumferential surface area of the hot plugs, $\delta_2/\lambda_2$ increases from 20% to 92%, and the value of the overall heat transfer coefficient K becomes about 52% of an original value, a heat flow from the hot plugs to the outside decreasing to 52%.

Therefore, unless the area of contact portions of the outer circumferential surfaces of the hot plugs and the hot plug-surrounding outer wall surface is set to not more than ⅕, i.e. 20% of that of the whole outer surface of the hot plugs, a heat flow from the hot plugs cannot be reduced to not more than a half.

Consequently, in the heat insulating structure for swirl chambers according to the present invention, setting the area of contact portions of the outer circumferential surfaces of the hot plugs and outer wall surface to not more than ⅕, i.e. 20% of a total area of the outer surfaces of the hot plugs will provide an optimum heat insulating structure.

Since this heat insulating structure for swirl chambers has the above-described construction, it is possible to reduce the amount of heat radiated from the hot plugs to the cylinder head and cylinder block to not more than half, reduce the starting time greatly when the temperature is low, improve the low-temperature startability, and improve the engine performance by increasing the thermal efficiency.

DESCRIPTION OF THE PREFERRED EMBODIMENT

An embodiment of a heat insulating structure for swirl chambers according to the present invention will now be described with reference to the drawings. An embodiment of the heat insulating structure for swirl chambers according to the present invention will be described with reference to FIG. 1.

Figure 1:
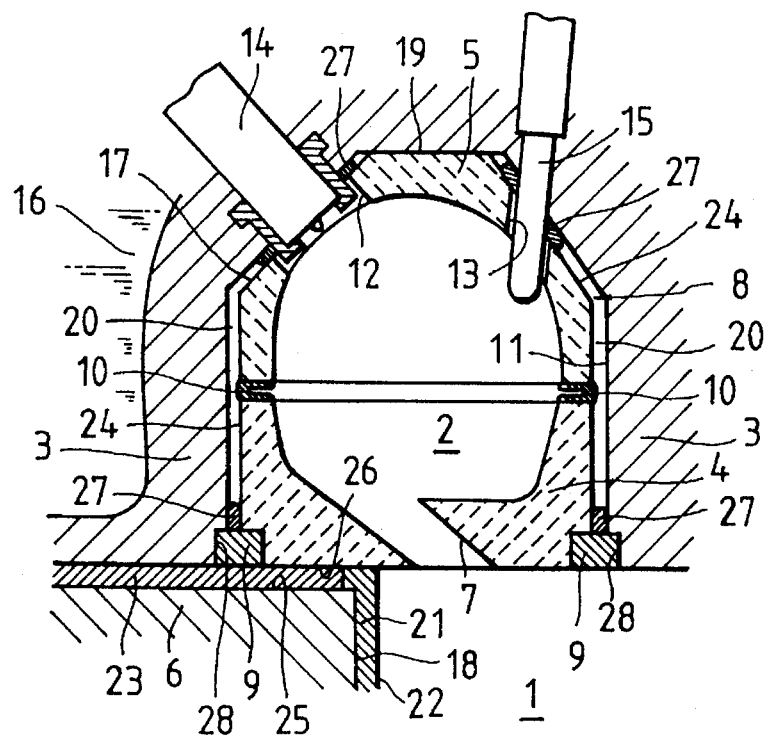
FIG. 1 is a sectional view showing an embodiment of the heat insulating structure for swirl chambers according to the present invention.

A swirl chamber type engine shown in FIG. 1 has cylinder liners 21 forming cylinders 22 fitted in bores 18 formed in a cylinder block 6, a cylinder head 3 fixed to the cylinder block 6 via a gasket 23, and hot plugs 8 forming swirl chambers 2 and provided in cavities 11 formed in the cylinder head 3. Each not plug 8 has a vertically two-divided construction comprising an upper portion (hot plug upper portion) 5 and a lower portion (hot plug lower portion) 4 which are formed out of a heat resisting ceramic material, such as silicon nitride. Between the upper and lower portions 5, 4, a hot plug gasket 10 formed out of a material, such as heat resisting alloy having an elasticity and a high heat resistance is interposed. The gasket 10 is formed so as to have a U-shaped cross section and so as to be opened in the swirl chamber 2, whereby an annular groove capable of fulfiling the swirl guiding function is formed in the swirl chamber 2. The upper portion 5 is provided with a fuel injection bore 12 in which an injection nozzle 15 is installed, and a plug bore 13 in which a glow plug 14 is installed. The lower portion 4 is provided with a communication port 7 for communicating the swirl chamber 2 and a primary combustion chamber 1 with each other.

A heat insulating structure for this swirl chamber has a tapering surface 17 on an outer circumferential side of an upper part of the upper portion 5, and a fixing ring 9 press fitted in a stepped portion 28 at a lower part of a cavity 11 in the cylinder head 3. The fixing ring 9 is formed out of a metal, such as SUS and cast iron. In order to position the upper and lower portions 5, 4 in the cavity 11 in the cylinder head 3, the gasket 10 is interposed between the upper and lower portions 5, 4, and a top surface 19 of the upper portion 5 is supported on a wall surface of the cavity 11 in the cylinder head 3, a lower surface of the lower portion 4 being brought into contact with the fixing ring 9 so as to reduce the contact surface area as much as possible. A heat insulating air layer 20 is formed in the whole region between the outer surfaces of the upper and lower portions 5, 4 and a wall surface of the cavity 11. The cylinder head 3 is provided with a water jacket 16 in which cooling water is circulated.

At a lower part of the hot plug 8, a seal gasket 27 is provided between the outer circumferential surface of the lower portion 4 and a wall surface of the cavity 11 in the cylinder head 3. At the parts of the upper portion 5 which are around a fuel injection bore 12 and a plug bore 13, seal gaskets 27 are provided between the outer circumferential surface of the upper portion 5 and the wall surface of the cavity 11 in the cylinder head 3. Therefore, the heat insulating air layer 20 is shut off substantially completely from the primary combustion chamber 1 and swirl chamber 2, and a fuel gas does not flow from the primary combustion chamber 1 and swirl chamber 2 into the heat insulating air layer 20. This enables the temperature and pressure in the heat insulating air layer 20 to be set lower than those in the primary combustion chamber 1 and swirl chamber 2, and a heat transfer coefficient of the heat insulating air layer 20 to be reduced.

In this heat insulating structure for swirl chambers, a gasket 10 is interposed between the upper and lower portions 5, 4 as mentioned above, and the setting of a surface pressure of the metal ring 9 with respect to the upper and lower portions 5, 4 is done easily, so that the positioning of the upper and lower portions 5, 4 in the lateral direction, i.e., in the leftward and rightward directions of the cavity 11 can be done accurately. The hot plug gasket 10 also has a function of preventing a gas from flowing into the air layer.

A decrease in the surface pressure of the fixing ring 9 to the upper and lower portions 5, 4 is low even with respect to the abrasion between the upper and lower portions 5, 4 which occurs due to repeated thermal loads occurring in the same portions 5, 4. The fixing ring 9 has a small contact surface area with respect to the lower portion 4, and the heat insulating air layer 20 is formed between the outer circumferential surfaces of the upper and lower portions 5, 4 and the wall surface of the cavity 11. Accordingly, the transmission of heat from the upper and lower portions 5, 4 to the cylinder head 3 through the fixing ring 9 can be minimized, and the degree of heat insulation of the swirl chamber 2 can be increased.

In this heat insulating structure for swirl chambers, the upper and lower portions 5, 4 which constitute the hot plug 8 are formed out of a ceramic material, such as heat insulating silicon nitride, an area of contact portions of an outer circumferential surface 24 of the hot plug 8 and its outer wall, i.e. an area of contact portions of an upper surface 19, i.e. a top surface of the hot plug 8 and the wall surface of the cavity 11 in the cylinder head 3 plus an area of contact portions of a lower surface 26 of the hot plug 8 and a gasket 23 on an upper surface 25 of the cylinder block 6 is set to not more than 1/5, i.e. 20% of a total outer surface area of the hot plug 8.

Figure 4:
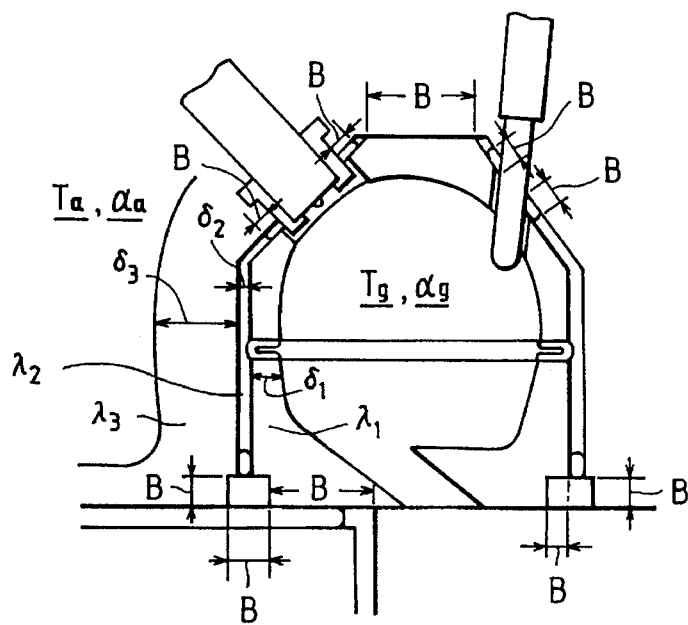
FIG. 4 is an illustration for describing an overall heat transfer coefficient of a heat insulating structure for swirl chambers according to the present invention.
Figure 5:
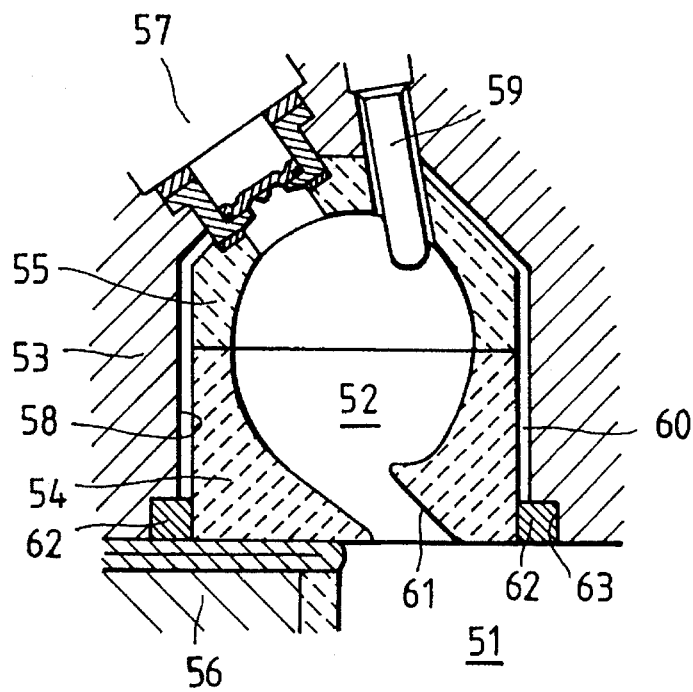
FIG. 5 is a sectional view showing an example of the construction of a conventional swirl chamber.
Figure 6:
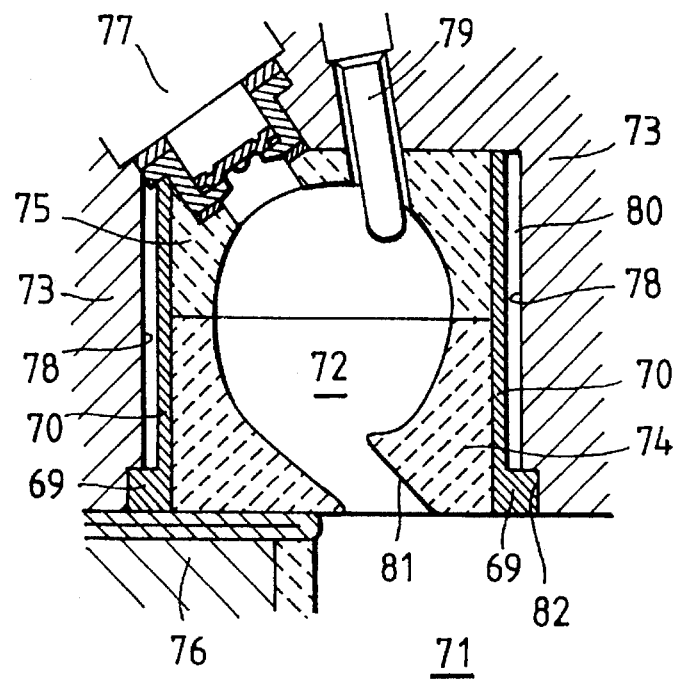
FIG. 6 is a sectional view showing another example of the construction of a conventional swirl chamber.

In this embodiment, the directly contacting portions of the outer circumferential surface 24 of the hot plug 8 and outer walls including the cylinder head 3 and cylinder block 6, and the indirectly contacting portions of the former which are engaged with the latter via the gasket 23, fixing ring 9 and seal gaskets 27 correspond to the regions shown by reference letters B, for example, in FIG. 4.

In this heat insulating structure for swirl chambers, a part of the upper surface 19 of the hot plug is supported on the cylinder head 3, and a part of the lower surface 26 thereof on the cylinder block 6, the lower portion of the hot plug 8 being fixed to the cylinder head 3 by the fixing ring 9. The contact portions of the outer circumferential surface 24 of the hot plug 8 and the wall surface of the cavity 11 in the cylinder head 3 and upper surface 25 of the cylinder block 6 include at least the contact portions of the lower surface 26 of the hot plug 8 and upper surface 25 of the cylinder block 6, the contact portions (corresponding to the contact surfaces of the fixing ring 9 and cylinder head 3 and cylinder block 6) of the fixing ring 9 and lower portion of the hot plug 8, and the contact portions of the upper surface 19 of the hot plug 8 and wall surface of the cavity 11 in the cylinder head 3.

This heat insulating structure for swirl chambers is formed as described above. A value of the heat conductivity of the outer circumferential surface of the hot plug 8, i.e. a value of the heat conductivity $\lambda_2$ of the air layer 20 existing on the outer circumference of the hot plug 8 is expressed by a function of area as follows.

$$\lambda_2 = \lambda_a + \frac{A_2 x}{A_1 x} \times (\lambda_g - \lambda_a)$$

wherein $A_1 x$ represents the outer surface area of the hot plug 8; $A_2 x$ the overall heat transfer surface area of the gasket 23 contacting the outer circumferential surface of the hot plug 8; $\lambda_a$ the heat conductivity of the air on the outer circumference of the hot plug 8; and $\lambda_g$ the heat conductivity of a combustion gas.

An overall heat transfer coefficient K of the outer circumference of the hot plug is shown by using the $\lambda_2$ as follows.

$$\frac{1}{K} = \frac{1}{\alpha_a} + \frac{1}{\alpha_g} + \frac{\delta_1}{\lambda_1} + \frac{\delta_2}{\lambda_2} + \frac{\delta_3}{\lambda_3}$$

wherein the heat conductivity of the hot plug is represented by $\lambda_1$; the heat conductivity of the air layer 20 and gasket 23 $\lambda_2$; the heat conductivity of the cylinder head $\lambda_3$; the heat conductivity of the cooling water circulated in the water jacket 16 formed in the cylinder head $\alpha_g$; the heat conductivity of a combustion gas in the swirl chamber 2 $\alpha_g$; the thickness of the hot plug 8 $\delta_1$; a clearance in which the air layer 20 is formed $\delta_2$; and a distance between the wall surface of the cavity 11 and water jacket 16 $\delta_3$. Let $\delta_1, \delta_2, \delta_3$ equal 1 in order to simplify the calculations.

$$\frac{1}{K} = \frac{1}{\alpha_a} + \frac{1}{\alpha_g} + \frac{1}{\lambda_1} + \frac{1}{\lambda_2} + \frac{1}{\lambda_3}$$

wherein, if $$A = \frac{1}{\alpha_a} + \frac{1}{\alpha_g} + \frac{1}{\lambda_1} + \frac{1}{\lambda_3},$$

$$\frac{1}{K} = A + \frac{1}{\lambda_2}$$

$$K = \frac{1}{A} \times \frac{\lambda_2}{\lambda_2 + 1/A}$$

$$K = \frac{1}{A} \times \left(1 - \frac{1/A}{\lambda_2 + 1/A}\right)$$

Therefore, $$K - \frac{1}{A} = \frac{1}{A^2} \times \frac{1}{\lambda_2 + 1/A}$$

Since an amount of radiation heat has relation $Q = K \cdot A \cdot (Tg - Ta)$, the amount of radiation heat Q is a function of K. Accordingly, when the values of K and $\lambda_2$ are graphed, the results are as shown in FIG. 2.

Figure 2:
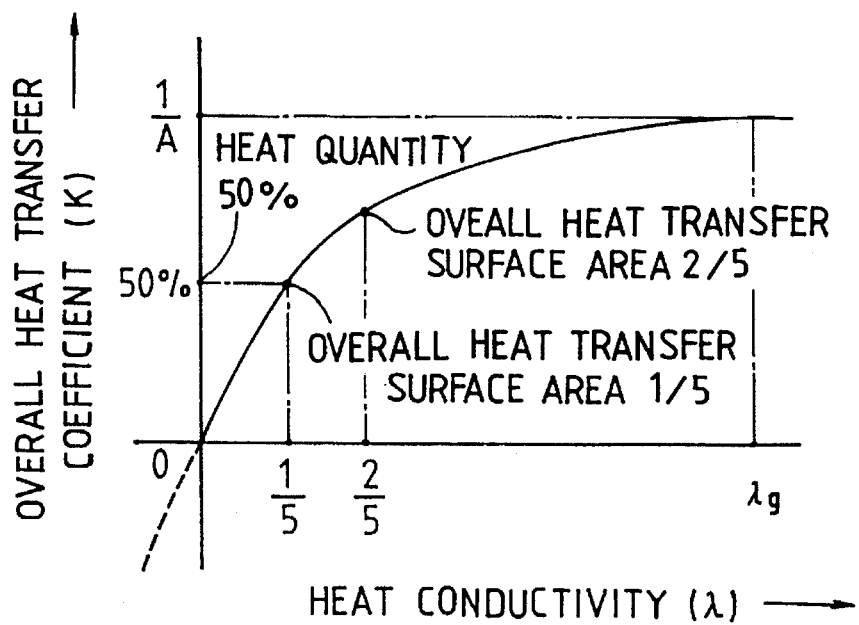
FIG. 2 is a graph showing the relation between the heat conductivity $\lambda$ and overall heat transfer coefficient K of the outer circumferential surfaces of hot plugs which form the swirl chambers.

In FIG. 2, the lateral axis represents a heat conductivity $\lambda_2$ of the heat insulating layer 20 on the outer circumferential surface 24 of the hot plug 8 and gasket 23, and the vertical axis an overall heat transfer coefficient K.

As may be understood from FIG. 2, a heat flow cannot be reduced unless a value of $\lambda_g$ becomes not larger than ¼. Consequently, unless the overall heat transfer surface area is set to not larger than ⅕, the heating value cannot be reduced to not more than a half (50%).

The low-temperature starting performance of a diesel engine was then determined. The atmospheric temperature was −20° C., and the oil 10W. A 1.7 l diesel engine having swirl chambers 2 was used. The results are shown in a graph of FIG. 3.

Figure 3:
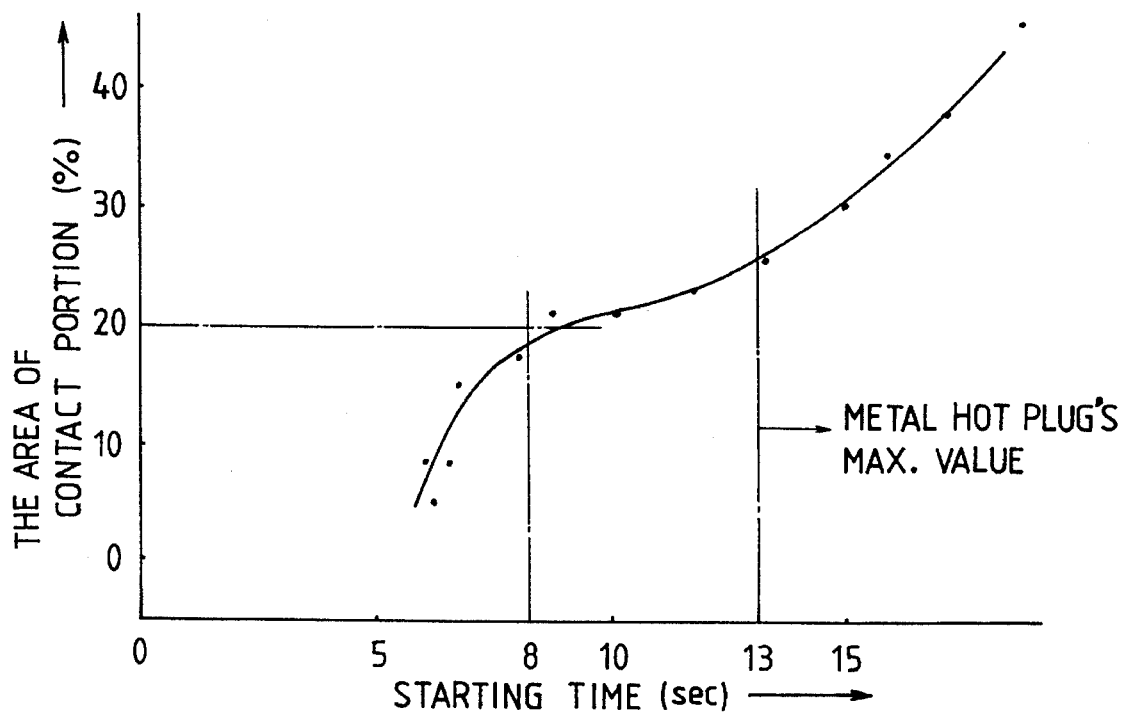
FIG. 3 is a graph showing the relation between the area of contact portions of the outer surfaces of the hot plugs, which form the swirl chambers, and outer walls and starting time.

FIG. 3 is a graph showing the low-temperature startability of the hot plug 8. The lateral axis represents starting time (sec), and the vertical axis a ratio (%) of the area of contact portions of the outer circumferential surface 24 of the hot plug 8 and an outer wall. As may be understood from FIG. 3, the reduction of the area of contact portions of the outer circumferential surface 24 of the hot plug 8 enables the startability to be improved.

As may be understood from FIG. 3, when an area of contact portions of the outer surface of the hot plug 8 and outer wall is set to not more than ⅕, i.e. 20% of a total area of the outer surface of the hot plug 8, the starting time can be reduced to as short as 7–8 sec. As may be understood from FIG. 2, the overall heat transfer coefficient can be reduced rapidly. In order to compare the hot plug 8 having the heat insulating structure for swirl chambers according to the present invention with a conventional metal hot plug, a region of a maximum value (not less than 13 sec) of the conventional metal hot plug is shown in FIG. 3.

What is claimed is:

1. A heat insulating structure for swirl chambers, comprising a cylinder block forming cylinders therein, a cylinder head fixed on said cylinder block via a gasket, hot plugs provided in cavities formed in said cylinder head, constituting swirl chambers, and formed out of a heat resisting material, communication ports formed in said hot plugs and communicating said swirl chambers and said cylinders with each other, fixing rings fitted in stepped portions of said cavities which are formed in said cylinder head so as to fix said hot plugs to said cavities in said cylinder head, injection nozzles for spraying a fuel in an atomized state into said swirl chambers, and seal gaskets provided between said hot plugs and said cavities so as to seal heat insulating air layers formed between said hot plugs and said cavities, the sum of an area of contact portions of said hot plugs and said cavities in said cylinder head and that of contact portions of said hot plugs and said cylinder block being set to substantially not more than 20% of a total area of outer surfaces of said hot plugs, whereby a heat insulating capability of said hot plugs is increased by reducing a rate overall heat transfer from said hot plugs to said cylinder head and said cylinder block.

2. A heat insulating structure for swirl chambers according to claim 1, wherein said hot plugs are formed out of a heat resisting ceramic material.

3. A heat insulating structure for swirl chambers according to claim 1, wherein contact portions of said hot plugs and said cavities in said cylinder head are directly engaged with each other.

4. A heat insulating structure for swirl chambers according to claim 1, wherein contact portions of said hot plugs and said cavities in said cylinder head are engaged with each other indirectly via said seal gaskets.

5. A heat insulating structure for swirl chambers according to claim 1, wherein contact portions of said hot plugs and said cylinder block are engaged with each other indirectly via said gasket.

6. A heat insulating structure for swirl chambers according to claim 1, wherein said hot plugs are supported at a part of an upper surface of each thereof on said cylinder head, and fixed at a lower outer circumferential portion of each thereof to said cylinder block by fixing rings, said seal gaskets being sealed so that a gas does not enter said heat insulating air layers.

7. A heat insulating structure for swirl chambers according to claim 1, wherein contact portions of said hot plugs and said cavities in said cylinder head are contact portions of said hot plugs and said fixing rings, and those of upper surfaces of said hot plugs and said cavities in said cylinder head.

8. A heat insulating structure for swirl chambers according to claim 1, wherein said contact portions of said hot plugs and said cylinder block are contact portions of lower surfaces of said hot plugs and an upper surface of said cylinder block, and said gasket.

9. A heat insulating structure for swirl chambers according to claim 1, wherein each of said hot plugs comprises an upper portion, a lower portion, and a hot plug gasket interposed between said upper and lower portions.

10. A heat insulating structure for swirl chambers according to claim 9, wherein said heat insulating air layers formed between the outer surfaces of said hot plugs and said cavities are sealed with said seal gaskets provided between the outer circumferential surfaces of said hot plugs and said canities, and said hot plug gaskets interposed between said upper and lower portions.

11. A heat insulating structure for swirl chambers according to claim 1, wherein said swirl chambers are provided with starting aiding glow plugs.

12. A heat insulating structure for swirl chambers according to claim 1, wherein said seal gaskets are seal gaskets provided along said fixing rings.

13. A heat insulating structure for swirl chambers according to claim 1, wherein said seal gaskets are seal gaskets provided along the outer circumferences of said injection nozzles.

14. A heat insulating structure for swirl chambers according to claim 11, wherein said seal gaskets are seal gaskets provided along the outer circumferences of said glow plugs.

\* \* \* \* \*